UNITED STATES PATENT OFFICE.

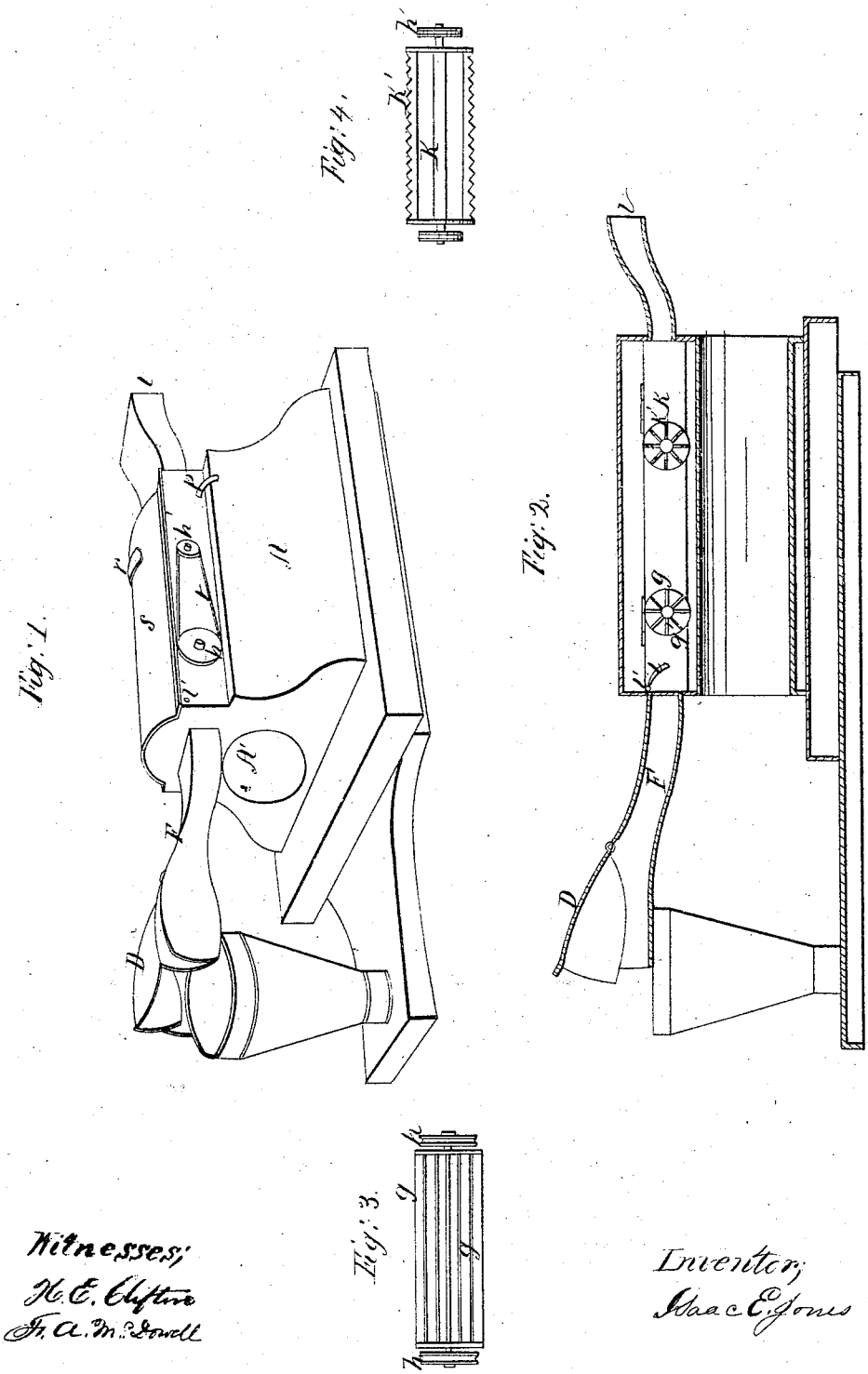

ISAAC E. JONES, OF CINCINNATI, OHIO.

SPARK-ARRESTER.

Specification of Letters Patent No. 25,650, dated October 4, 1859.

*To all whom it may concern:*

Be it known that I, ISAAC E. JONES, of Cincinnati, in the county of Hamilton and State of Ohio, have invented a new and useful Improvement in Spark-Arresters for Locomotives, &c.; and I do hereby declare that the following is a full and clear description thereof, reference being had to the accompanying drawings, and to the letters of reference marked thereon and made to form a part of this specification.

The nature of my invention relates to the employment of a water tank so constructed and arranged upon the top of the cab, or housing of locomotives that all the smoke, sparks and cinders coming from the smoke stacks of said locomotives may be received within said tank, the sparks and cinders be arrested and extinguished and the smoke discharged as hereinafter described in combination with a wind wheel and an agitator by means of which the upper part of the said tank may be filled with fine spray, thereby facilitating the extinguishment of the sparks, &c.

In reference to the accompanying drawings Figure 1 is a perspective view of my improvement, with all its parts arranged for operation. Fig. 2, is a longitudinal sectional view of the same showing the arrangement of the wind wheel and agitator. Fig. 3, is a side view of the wind wheel. Fig. 4 is a side view of the agitator.

(A) represents the water tank formed somewhat larger at its base than at its top and with a longitudinal cylindrical opening (A') by means of which a large portion of space within the tank is occupied, greater lateral bearing afforded to the weight of water in proportion to the quantity used, and less obstruction offered to the air; the said tank (A) will be secured upon the top of the housing of the engine and in rear of the smoke stack, and is provided with a reception pipe or trunk (F), which at its forward end is formed sufficiently broad to cover the greatest diameter of the smoke stack, so that all the smoke, cinders, &c., coming therefrom may be conducted to the tank (A). The said trunk is provided with a hood (D) which may be elevated when the engine is not in motion and the smoke &c. thereby allowed to pass off into the air.

(v) is an escape pipe for the discharge of the smoke from the tank after it has been freed from its sparks, cinders, &c.

(g) is a wind wheel arranged within and near the forward part of the tank (A) formed with longitudinal buckets (g') and provided with pulleys (h) by means of which the agitator (k) is made to operate; said agitator (k) is arranged in rear of the wind wheel (g) near the after end of the tank as fully shown in Fig. 2, and is provided with notched buckets (k') so that as it is made to rotate, the water is elevated in fine spray so as to come in contact with all the sparks which may be introduced within the tank.

(l) is a valve hinged to the tank (A) at (l') and arranged to incline downward so as to force the air passing through the trunk (F) into certain contact with the buckets (g') of the wheel (g).

(p) is an indicating pipe leading from the inside of the tank and serves as a guide in filling the tank with water. The said pipe being adjusted in the tank at the proper point, for high water mark, the water begins to escape through it whenever the tank is filled beyond that point.

A discharge aperture may be formed in the bottom of the tank, so that the sparks, cinders, etc. may be carried away as the water runs from the tank, (r) represents an aperture in the lid (s) of the tank, through which the tank may be filled with water.

(t) is a band arranged to pass over pulley (h) of wheel (g) and pulley (h) of the agitator through medium of which the said agitator is made to operate.

Having described the construction of my invention its operations may be set forth as follows: The hood or cap (D) of the trunk being in the position shown in Fig. 1, and the engine being made to move forward, the smoke with all the sparks, cinders, etc. coming from the smoke stack of the locomotive will be forced through the trunk (F) into the tank (A) under the valve (l) and against the buckets of the wheel (g) by means of which the said wheel (g) will be made to rotate, thereby causing the agitator (k) to rotate as before described and throwing the water in fine spray to the lid of the tank so that the sparks must necessarily be arrested and extinguished. The smoke after being purified by its passage through the water and freed from sparks and cinders is permitted to escape from the tank (A) through the discharge pipe (v).

What I claim and desire to secure by Letters Patent, is—

The arrangement of the tank (A, A') wind wheel (g) and agitator (k) with reference to the receiving trunk (F) and valve l, all being constructed and arranged to operate conjointly as herein described and for the purposes set forth.

In testimony of which invention I have hereunto set my hand.

ISAAC E. JONES.

Witnesses:
H. E. CLIFTON,
F. A. McDOWELL.